United States Patent [19]

Murray et al.

[11] Patent Number: 5,112,499

[45] Date of Patent: May 12, 1992

[54] PROCESS FOR TREATING POND WATER

[75] Inventors: Michael A. Murray, Harvey; Charles W. Weston, Prairieville, both of La.

[73] Assignee: Freeport-McMoran Resource Partners, Limited Partnership, New Orleans, La.

[21] Appl. No.: 704,203

[22] Filed: May 22, 1991

[51] Int. Cl.⁵ .............................. C02F 1/60; C02F 1/52
[52] U.S. Cl. .................................... 210/713; 210/724; 210/906; 210/915; 423/163; 423/339; 423/490; 423/308
[58] Field of Search ............... 210/713, 714, 906, 915, 210/724; 423/163, 167, 339, 490, 307, 308, 311, 312

[56] References Cited

U.S. PATENT DOCUMENTS

| | | | |
|---|---|---|---|
| 3,551,332 | 12/1970 | Baumann et al. | 210/915 |
| 3,725,265 | 4/1973 | Legal, Jr. | 210/906 |
| 4,171,342 | 10/1979 | Hirko et al. | 210/906 |
| 4,284,515 | 8/1981 | Liu | 210/906 |
| 4,320,012 | 3/1982 | Palm et al. | 210/713 |
| 4,374,810 | 2/1983 | O'Neil | 210/906 |
| 4,402,833 | 9/1983 | Bennett et al. | 210/906 |
| 4,402,923 | 9/1983 | Lang | 423/166 |
| 4,472,368 | 9/1984 | O'Neil et al. | 423/490 |
| 4,657,680 | 4/1987 | Zibride | 210/906 |
| 4,689,154 | 8/1987 | Zimberg | 210/906 |
| 4,698,163 | 10/1987 | Zibrida | 210/906 |
| 4,717,558 | 1/1988 | Beck et al. | 210/906 |

Primary Examiner—Stanley S. Silverman
Assistant Examiner—Neil M. McCarthy
Attorney, Agent, or Firm—Fisher, Christen & Sabol

[57] ABSTRACT

A two-stage process for treating acidic gypsum pond water for reuse or for discharge is disclosed. The first stage blends raw acidic pond water with recycled lime-treated slurry from the second stage of the process. The resulting elevation in pH causes $CaF_2$ and $SiO_2$ to precipitate and the precipitated material is discarded onto the gypsum storage area. The supernatant water can be used in the wet grinding mill and/or further treated in a second stage with lime to produce treated water which meets government environment standards for discharge. The slurry of calcium phosphate formed in the second (liming) stage is recycled to the first stage.

13 Claims, 1 Drawing Sheet

PROCESS FOR TREATING POND WATER

FIELD OF THE INVENTION

This invention relates to a method of treating gypsum pond water resulting from the operation of wet process phosphoric acid plants. More particularly, a process is disclosed for the treatment of the gypsum pond water to remove impurities such that the water is suitable for internal use in a phosphate rock grinding circuit of a phosphoric acid plant. The process is further able to treat acidic pond water for discharge.

BACKGROUND OF THE INVENTION

Gypsum pond water, or "pond water" as it will hereinafter be referred to, originates when by-product gypsum from the attack system of wet process phosphoric acid plants is slurried with water and pumped to large ponds where the gypsum settles out. The remaining supernatant water is highly acidic and contains various dissolved impurities, some of which are environmentally undesirable and cannot be discharged into water ways. Because of the acidity and the presence of the impurities, governmental regulations prohibit the discharge of the pond water unless it is treated to neutralize the acidity and to reduce the concentration of the undesirable dissolved impurities to acceptable levels.

In much of the southeastern U.S. where annual rainfall exceeds evaporation, discharge of pond water is often necessary and phosphoric acid plants in the area are consequently obliged to frequently treat pond water for discharge. The typical neutralization treatment consists of a two-stage liming operation using lime/limestone to elevate the pH and to precipitate the impurities as insoluble calcium compounds and silica. However, the costs of such a treatment system are high. Furthermore, substantial phosphate values are lost in the precipitated sludge. Wet process plant operators, therefore, try to minimize treatment costs by consuming as much contaminated pond water as possible in phosphoric acid production to remain in water balance.

A major potential internal use for the pond water exists in plants which wet-grind phosphate rock in ball mills. These plants often use pond water instead of fresh water in the grinding circuit. The pond water is typically neutralized to reduce the corrosion rate of the grinding equipment. Several U.S. patents describe neutralization processes using various chemicals and procedures. See, for example, U.S. Pat. No. 4,402,923 to Lang. The Lang process partially neutralizes pond water with ammonia. The Lang process is not completely satisfactory because the treated water is still somewhat corrosive and, additionally, the ammonium ion can cause precipitation problems in subsequent phosphoric acid processing operations.

Most pond water treatment processes use lime/limestone to neutralize the water. U.S. Pat. No. 4,320,012 to Palm et al describes a two-stage neutralization method for pond water wherein lime/limestone is used to raise the pH of the pond water to about 4.0 in the first stage and to about 8.0–11.0 in the second stage. The flocculent precipitate produced in the second neutralization stage is disposed of by dissolving it in incoming untreated pond water prior to the first neutralization stage. The process, while an improvement over some of the prior art pond water neutralization processes, still requires two liming steps. Also, the neutralization is carried out at such a high pH, that excessive amounts of lime/limestone are required. Additionally, most phosphate values originally contained in the pond water report in the first stage settler underflow and are thus lost in a stream destined for disposal.

In U.S. Pat. No. 4,472,368 to O'Neill et. al., pond water is treated using a partial liming process. The process removes nearly all of the fluoride component, giving a treated water which can be used in the phosphate rock wet grinding circuit without causing excessive corrosion. From 55% to 70% of the phosphate component remains in solution and is thereby recovered. However, only that amount of water required for phosphate rock grinding may be consumed in this way. No excess water suitable for discharge is produced.

There exists a need in the wet process phosphoric acid industry for improved pond water and waste water treating processes which minimize the consumption of lime/limestone and which precipitate the bulk of the undesirable fluoride and fluosilicic compounds while retaining much of the phosphate values in a liquid stream for subsequent recovery in phosphoric acid production.

The present invention is directed to an improved process for treating pond water and waste water wherein the consumption of lime is minimized and which allows for the recovery of much of the phosphate values while precipitating and disposing of most of the fluoride and fluosilicic compounds. The process of the invention utilizes a two-stage process for treating pond water wherein lime addition is needed in only one of the stages thereby resulting in reduced lime consumption compared to conventional waste water treating processes.

The process of the invention further provides a process for treating pond water wherein a substantial fraction of its $P_2O_5$ content can be concentrated into a smaller stream of $P_2O_5$-enriched effluent suitable for use in the wet grinding circuit of a phosphoric acid plant and wherein the balance of the aqueous effluent is virtually void of phosphate and fluoride ions and meets environmental standards for discharge.

SUMMARY OF THE INVENTION

The present invention is directed to a process of treating waste water and particularly waste water from collection ponds of wet process phosphoric acid manufacture which contains fluoride and silicon-containing impurities. The process is a two-stage treatment wherein raw waste water or pond water having a pH of about 2.3 or less is introduced to a first reactor vessel where the waste water is blended with an aqueous slurry of calcium phosphate having a pH of about 6 to 8 to produce a dilute slurry having a pH of about 2.4 to 3.5 and preferably about 2.5 to 2.9. The pH is raised to this level without the addition of lime. The first stage reactor is maintained at about 33° to 160° F. and preferably about 60° to 90° F. for about 10 minutes to allow the fluoride compounds and fluosilicate compounds to precipitate as $CaF_2$ and $SiO_2$. The precipitates formed in the first stage contain only small amounts of phosphate values and are dewatered and discarded. The supernatant water may be used in wet process phosphoric acid production without further treatment or can be transferred to the second stage reactor for further purification.

In the second stage reactor the pH of the waste water is adjusted by the addition of lime to a pH of about 6 to 8. The waste water remains in the second stage for a time sufficient to precipitate the phosphate as calcium phosphate compounds and primarily CaHPO$_4$. The calcium phosphate precipitate is removed as a slurry and may be discarded or returned to the first stage reactor as the source of calcium phosphate. The waste water stream in the first reactor contains a higher concentration of phosphate compared to the incoming waste water stream. The partially treated waste water exiting the first treatment zone can be used in the phosphoric acid manufacture to recover substantial portions of the phosphate values. In preferred embodiments of the invention the process is continuous with the calcium phosphate being recycled to the first stage to be blended with the raw waste stream.

DETAILED DESCRIPTION OF THE INVENTION

Figure 1:
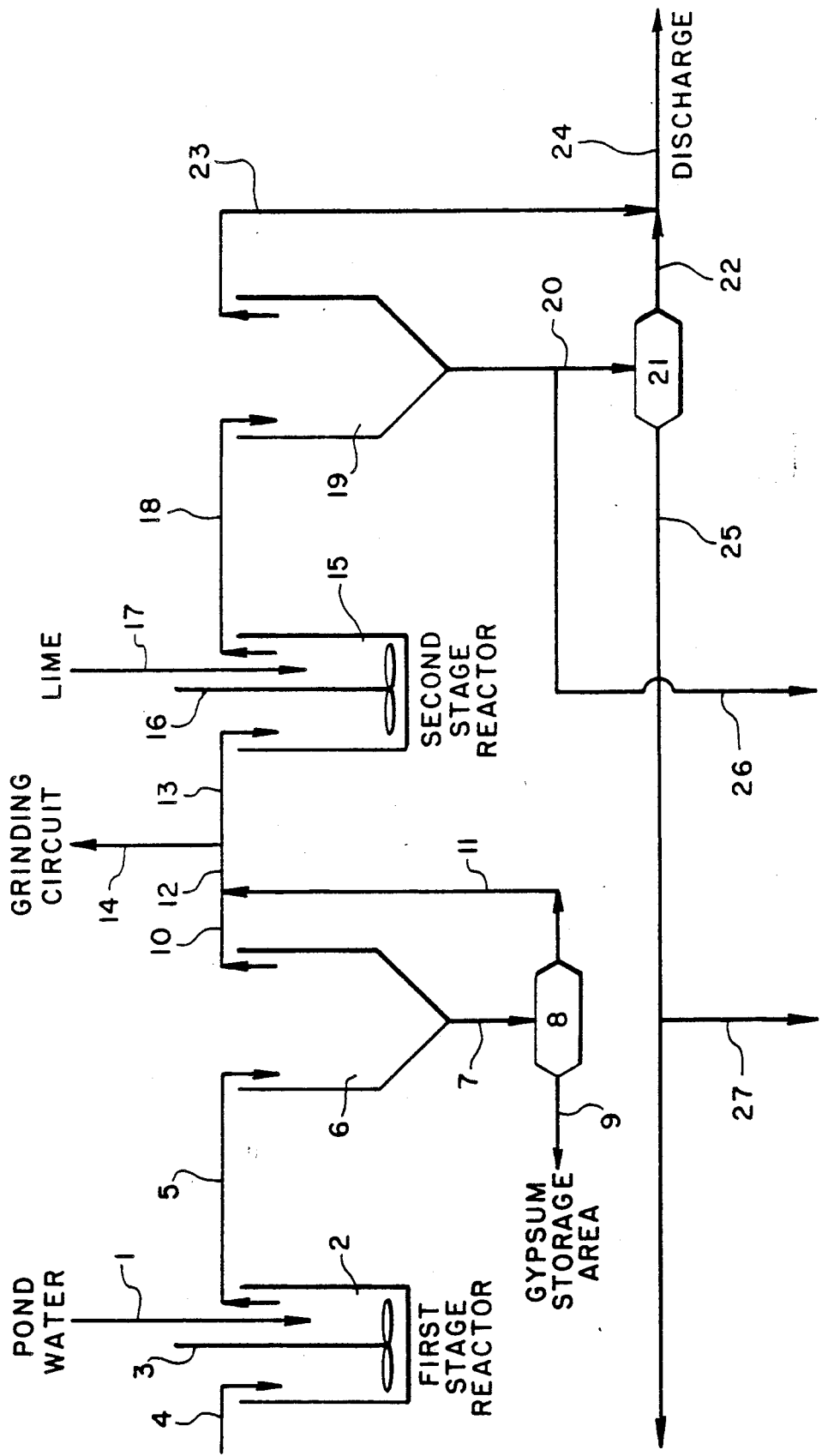
FIG. 1 provides a schematic flow diagram illustrating the process of the invention described herein.

The present invention is directed to a process of treating acidic waste water from wet process phosphoric acid production facilities. The process in accordance with the invention effectively reduces the silica and phosphate content of the waste water using reduced amounts of lime or limestone compared to conventional processes. Raw acidic waste water is combined with recycled phosphate slurry to raise the pH of the waste water and to precipitate the silica and fluorine-containing compounds without the addition of lime or limestone in the first stage. The resultant precipitates contain only small amounts of phosphate values. The precipitates are removed and the water is further neutralized by the addition of lime to precipitate the phosphate compounds in a second treatment stage. The phosphate precipitate is recycled as a concentrated slurry to the first reactor tank to precipitate the silica and the fluoride compounds.

Referring to FIG. 1, raw waste gypsum water from phosphoric production having a pH of less than about 2.3 enters first stage reaction vessel 2 via line 1. The waste water generally contains numerous impurities including phosphates, fluorides, sulfates and silicates. Concentrated aqueous slurry of calcium phosphate solids with pH of about 6 to 10, and preferably 6 to 8, also enters reaction vessel 2 via line 4. As described hereinafter in greater detail, the concentrated aqueous slurry of calcium phosphate solids is produced later in the process and recycled to the first stage reaction vessel 2. The waste water and the calcium phosphate slurry are thoroughly mixed by use of agitator 3 to obtain a pH-adjusted mixture with a pH of about 2.4 to 3.5 and preferably about 2.5 to 2.9. This pH range effectively allows chemical reactions to occur between the calcium phosphate compounds and the H$_2$SiF$_6$ contained in the waste water. Typical of these reactions is the following:

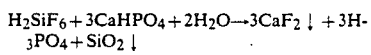

As a result of the above reaction, CaF$_2$ and SiO$_2$ are precipitated forming a slurry comprised of CaF$_2$ and SiO$_2$ solids dispersed in the partially treated pond water. The phosphate present in the recycled slurry largely redissolves to form phosphoric acid (H$_3$PO$_4$).

The resulting aqueous slurry of CaF$_2$ and SiO$_2$ solids is transferred from reactor 2 via line 5 to thickener 6 for solids-liquid separation. Alternately, a filter, or other similar equipment can be used in lieu of or in conjunction with the thickener 6. In thickener 6, a concentrated slurry containing the CaF$_2$ and SiO$_2$ solids is separated from the liquid phase, thereby producing a supernatant P$_2$O$_5$-enriched partially treated pond water of pH 2.4 to 3.5. The supernatant, partially treated water exits the thickener 6 and may be transferred via lines 10, 12 and 14 to the ball mill wet grinding circuit (not shown) and via lines 10, 12 and 13 to second stage reactor 15. If there is no need for the partially treated water in the grinding circuit of the phosphoric acid plant, all of the partially treated water is transferred via lines 10, 12 and 13 to the second stage reactor 15.

The concentrated slurry containing the CaF$_2$ and SiO$_2$ solids is removed from thickener 6 by line 7. The slurry solids retain a high percentage of water and a centrifuge step, while optional, is highly desirable to recover the phosphate values contained in the aqueous phase of the slurry. The concentrated slurry of CaF$_2$ and SiO$_2$ solids exits the thickener 6 through line 7 to centrifuge 8.

In centrifuge 8, additional partially treated waste water is removed from the concentrated slurry and is forwarded via lines 11, 12 and 14 to the ball mill wet grinding circuit and via lines 11, 12 and 13 to the second stage reactor 15. If there is no need for the partially treated pond water in the grinding circuit of the phosphoric acid plant, all of the partially treated water removed from the slurry is transferred via lines 11, 12 and 13 to the second stage reactor 15. A more concentrated slurry containing the CaF$_2$ and SiO$_2$ stream is discharged from centrifuge 8 and is transferred by line 9 to a gypsum storage area.

In agitated second stage reactor 15, the partially treated pond water from the first stage is treated with Ca(OH)$_2$ slurry added via line 17 to adjust the pH to a range of about 6 to 10 and preferably about 6 to 8. This pH range causes chemical reactions to occur between the Ca(OH)$_2$ and phosphate compounds contained in the partially treated pond water. Typical reactions include:

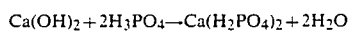

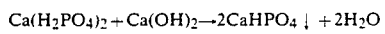

As a result of the reactions between Ca(OH)$_2$ and the phosphate compounds, calcium phosphate compounds (predominantly CaHPO$_4$) are precipitated and a dilute aqueous slurry of calcium phosphate solids is produced.

The dilute aqueous slurry of calcium phosphate exits reactor 15 via line 18 and is forwarded to thickener 19. In thickener 19, a concentrated, aqueous slurry containing essentially all the calcium phosphate solids is separated from the dilute aqueous slurry of calcium phosphate solids to produce a fully treated pond water of pH 6 to 10. The fully treated pond water exits thickener 19 and is sent to disposal via lines 23 and 24.

The concentrated slurry containing the calcium phosphate solids is removed from thickener 19 by line 20. As occurs with the first stage thickener slurry, the slurry solids retain a high percentage of water and a centrifuge step, while optional, is highly desirable for operational reasons. The concentrated slurry containing the calcium phosphate solids exits the thickener 19 through line 20 to centrifuge 21. Additional fully treated pond water exits the centrifuge 21 and is sent to disposal via lines 22 and 24. A more concentrated slurry containing the calcium phosphate solids is discharged from centrifuge 21. At least a portion of the concentrated calcium phosphate slurry is transferred by lines 25 and 4 to the first stage reaction vessel 2. Any slurry not needed in the first stage is transferred by line 26 and/or line 27 to another part of the plant.

When there is no need or only very limited need for the forwarding of the $P_2O_5$-enriched partially treated pond water via line 14 to the wet grinding circuit, phosphate values are removed from the circuit via line 26 in the form of a concentrated calcium phosphate slurry and/or via line 27 in the form of a more concentrated calcium phosphate slurry.

The principal advantage of the present invention is the reduction of the amount of lime needed for pond water treatment. Another advantage of the present invention over prior art is the improved $P_2O_5$ recovery, relative to that attained by Palm et al. (previously discussed), which results from operating in the first stage pH range, specified herein. The partially treated pond water formed by admixing the recycled phosphate slurry with the incoming pond waste water has a $P_2O_5$ concentration higher than that of the original pond water. The adjustment of the pH to a range of 2.4 to 3.5 causes precipitation of the fluoride and silica compounds. Thus, the partially treated waste water has a high phosphate content and a low fluoride content, and is suitable for use in wet grinding of phosphate rock. It is a further advantage of this invention over previous pond water treatment processes to provide a process which does not require the addition of lime or limestone in the first stage of pond water treatment and still generates a treated pond water which meets environmental standards for discharge. Other advantages will become obvious to those skilled in the art.

EXAMPLE 1

Pond water from phosphoric acid production containing 0.75% $P_2O_5$ and 0.18% fluorine, and having a pH of 2.2 was fed at a rate of 1124.5 g/min into the first stage reactor of the flow scheme depicted in FIG. 1. A complete analysis of the pond water is provided in Table I below. The first stage reactor was also fed with a concentrated $CaHPO_4$ slurry recycled from a later step of the process at a continuous rate of 67.1 g/min. The first stage reactor was sized to provide a retention time of 10 minutes and was operated at a pH of 2.6 by the addition of the recycled calcium phosphate slurry and at a temperature of 75° F. The dilute slurry formed in the first stage reactor was subjected to thickening in a thickening device and the thickener underflow was further processed by centrifugation. The overflows from the centrifuge and the first stage reactor were combined to yield a stream labeled "Liquid Phase from Stage 1". As evident from the analytical information provided in Table I, the $P_2O_5$ content of this stream was substantially higher than that of the pond water fed to the system, i.e., 1.04% $P_2O_5$ in the Liquid Phase from Stage 1 vs. 0.75% $P_2O_5$ in the stream labeled Pond Water. Because of its elevated $P_2O_5$ content, the Liquid Phase from Stage 1 is well suited for use in the wet grinding section of phosphoric acid plant, and 684.4 g/min of that stream were withdrawn from the pond water treatment circuit for that purpose. The remaining 461.0 g/min of Liquid Phase from Stage 1 was directed to the second stage reactor to which a 8.96% $Ca(OH)_2$ lime slurry was simultaneously added at a rate of 45.4 g/min. The second stage reactor was sized to provide a retention time of 30 minutes and was operated at a pH of 6.3. The dilute slurry from the second stage reactor was subjected to thickening and the thickener underflow was further processed by centrifugation. The overflows from these two unit operations were combined to yield a stream labeled "Liquid Phase from Stage 2". As evident from analytical data provided in Table I, this stream is substantially void of phosphate and fluoride ions, has a near-neutral pH and is suitable for discharge. The analytical information summarized in Table I also provides data on the composition of the solid phases of centrifuge underflows from Stage 1 and Stage 2. It is of interest to note that the solids generated in the first stage are relatively high in fluoride (30.3% F) and low in $P_2O_5$ (13.63% $P_2O_5$), while the solids generated in the second stage consist primarily of $CaHPO_4$ and are therefore relatively high in $P_2O_5$ (40.92% $P_2O_5$) and low in fluoride (8.8% F). The fluoride-rich slurry from the Stage 1 centrifuge was withdrawn from the pond water treatment circuit for disposal in the gypsum storage area. The $CaHPO_4$ slurry from the Stage 2 centrifuge was recycled to the first stage reactor, as noted hereinabove, wherein much of its $P_2O_5$ content dissolved and thereby enriched the $P_2O_5$ concentration of the Liquid Phase from Stage 1.

TABLE I

| Stream | Summary of Analytical Data Corresponding to Example 1 | | | | | |
|---|---|---|---|---|---|---|
| | pH | % $P_2O_5$ | % F | % $SiO_2$ | % $SO_4$ | % Ca |
| Pond Water | 2.2 | 0.75 | 0.18 | 0.11 | 0.28 | 0.09 |
| Liquid Phase from Stage 1 | 2.6 | 1.04 | 0.15 | 0.09 | 0.29 | 0.29 |
| Solid Phase from Stage 1 | — | 13.63 | 30.3 | 1.1 | 2.3 | 31.8 |
| Liquid Phase from Stage 2 | 6.3 | 0.07 | 0.03 | 0.07 | 0.23 | 0.01 |
| Solid Phase from Stage 2 | — | 40.92 | 8.8 | 0.6 | 1.6 | 31.8 |

EXAMPLE 2

In Example 1, the liquid phase from Stage 1 is split, with 461.0 g/min. out of 1145.4 g/min. going to Stage 2. Alternatively, the entire liquid stream from Stage 1 is treated in Stage 2. In that case, the lime slurry stream and the two outlet streams from Stage 2 are increased in size by a factor of 1145.4/461.0, or 2.485. The analyses of the solid and liquid phases from Stage 2 are the same as shown in Example 1. The slurry from Stage 2 is split; only 1/2.485 = 0.4024 of the stream is recycled to Stage 1.

What is claimed is:

1. A two-stage process for treating gypsum pond water from wet process phosphoric acid plants, wherein the pond water has a pH of less than 2.3 and contains compounds of fluorides and phosphates in solution, to produce partially treated pond water suitable for use in the wet grinding circuits of the phosphoric acid plants and fully treated pond water for discharge, comprising:
   a. transferring gypsum pond water to a first stage reaction vessel of a first stage comprising said first stage reaction vessel and a solids-liquid separation device;
   b. admixing in the first stage reaction vessel said gypsum pond water with sufficient concentrated aqueous slurry of recycled calcium phosphate solids having a pH of 6 to 10, to obtain a partially treated pond water slurry with a pH of 2.4 to 3.5, wherein said pH is sufficiently low to cause the calcium phosphate to dissolve and sufficiently high enough to cause partial precipitation of fluoride and silica compounds as $CaF_2$ and $SiO_2$;

c. transferring the partially treated pond water containing the $CaF_2$ and $SiO_2$ precipitates to the solids-liquid separation device of the first stage and separating the $CaF_2$ and $SiO_2$ precipitates from the pond water slurry and recovering a partially treated pond water of pH 2.4 to 3.5 with lowered fluoride compound content but containing, in solution, substantially all the phosphate compounds originally contained in the gypsum pond water;

d. forwarding a portion of the partially treated pond water to a reaction vessel of a second stage comprising a second stage reaction vessel and a solids-liquid separation device;

e. adding sufficient lime to the partially treated pond water contained in the second stage reaction vessel to adjust the pH to about 6 to 10 thereby causing the precipitation of calcium phosphate and producing a dilute aqueous slurry of calcium phosphate solids;

f. transferring the dilute aqueous slurry of calcium phosphate to the solids-liquid separation device of the second stage and separating a concentrated aqueous slurry of calcium phosphate solids from the dilute aqueous slurry of calcium phosphate solids to produce a fully treated pond water of pH 6 to 10, wherein said water is suitable for disposal; and g. recycling all or a part of the concentrated aqueous slurry containing calcium phosphate solids to the first stage reaction vessel of Step (b).

2. The process of claim 1 wherein all of the partially treated pond water is forwarded to the reaction vessel of the second stage, and wherein part of the concentrated aqueous slurry of calcium phosphate solids from Step (f) is removed from the pond water treatment circuit.

3. The process of claim 1 wherein the pH in the first stage reaction vessel is maintained in the range of 2.5 to 2.9.

4. The process of claim 1 wherein sufficient lime is added to the partially treated water in Step (e) to adjust the pH to about 6 to 8.

5. The process of claim 1 wherein the solids-liquid separation device comprises a thickener and a centrifuge.

6. The process of claim 1 wherein the solids-liquid separation device is a thickener.

7. The process of claim 1 wherein the solids-liquid separation device is a filter.

8. The process of claim 1 wherein the solids-liquid separation device is a centrifuge.

9. A two stage process of treating waste waters from phosphoric acid production plants, wherein said waste waters have a pH of less than about 2.3 and contain fluoride and phosphate materials in solution, said process including a first stage comprising a first reaction step and a first solids-liquid separation step and a second stage comprising a second reaction step and a second solids-liquid separation step, said process comprising admixing waste water in said first reaction step with a recycled phosphate-containing slurry having a pH of about 6.0 to 10.0 obtained from said second solid-liquid separation step whereby a partially treated waste water stream is produced having a pH of about 2.4 to 3.5 and whereby a substantial portion of fluoride compounds are precipitated without the addition of lime or limestone; separating precipitated compounds in said first solids-liquid separation step to produce a partially treated waste water stream containing dissolved phosphate materials suitable for use in phosphoric acid production; neutralizing said partially treated waste water stream in said second reaction step by adding lime to adjust the pH to about 6.0 to 10.0 and to precipitate phosphate materials; separating precipitated phosphate materials in said second solids-liquid separation step to produce fully treated waste waters; concentrating said precipitated phosphate materials to form a concentrated slurry; recycling said concentrated slurry to additional waste water having a pH of less than about 2.3 whereby said precipitated phosphate materials dissolve, and discharging said fully treated waste waters.

10. The process of claim 9 wherein said recycled phosphate containing slurry has a pH of about 6.0 to 8.0.

11. The process of claim 9 wherein said partially treated waste water has a pH of about 2.5 to 2.9.

12. The process of claim 9 wherein the precipitated phosphate material is concentrated to form a concentrated slurry before being recycled.

13. A process for treating acidic waste water from phosphoric acid producing plants, wherein said waste water has a pH of less than about 2.3 and contains fluoride and phosphate materials in solution, said process consisting essentially of the steps of admixing acidic waste water with a concentrated aqueous slurry of calcium phosphate having a pH of about 6 to 10 to dissolve solid calcium phosphate and precipitate fluoride and silica compounds thereby producing partially treated waste water having a pH of about 2.4 to 3.5; separating said fluoride and silica compounds to form phosphate-containing partially treated waste water; neutralizing said partially treated waste water by addition of lime to adjust the pH to about 6.0 to 10.0 and to precipitate a substantial portion of phosphate materials; separating said precipitated phosphate materials to form treated waste waters having a pH of 6.0 to 10.0, wherein said precipitated phosphate materials are separated as a concentrated slurry, and; recycling said concentrated slurry of phosphate material for admixing with additional acidic waste waters.

* * * * *